(No Model.)
G. W. MILTIMORE.
CAR WHEEL.
No. 267,916. Patented Nov. 21, 1882.
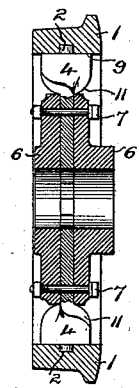
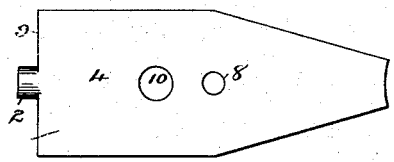
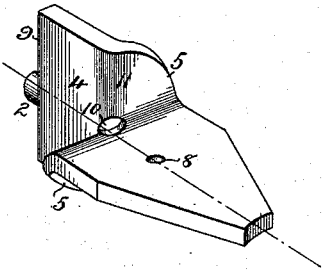
Attest;
Geo. H. Graham
A. N. Jasbera
Inventor,
George W. Miltimore,
by Munson & Philipp
Att'ys.

UNITED STATES PATENT OFFICE.

GEORGE W. MILTIMORE, OF CHICAGO, ILLINOIS.

CAR-WHEEL.

SPECIFICATION forming part of Letters Patent No. 267,916, dated November 21, 1882.

Application filed September 26, 1882. (No model.) Patented in England August 15, 1882, No. 3,885.

*To all whom it may concern:*

Be it known that I, GEORGE W. MILTIMORE, a citizen of the United States, residing in the city of Chicago, county of Cook, and State of Illinois, have invented certain new and useful Improvements in Car-Wheels, fully described and represented in the following specification and the accompanying drawings, forming a part of the same.

Wheels for railway-cars were formerly almost universally made of cast-iron and in a single piece. To obviate many disadvantages attending the use of wheels made of this material and in this manner, principal among which is their liability to crack, particularly in cold weather, it has in recent years been found desirable to make these wheels by building them up from separate parts—that is to say, making the rim, spokes, and hub in separate pieces.

The present invention relates to this last-named class of wheels, and particularly to a wheel of the construction shown and described in United States Letters Patent Nos. 261,944, 262,909, and 262,910.

It is well known to those familiar with the art that the rim or tire of a car-wheel, when in use, is gradually drawn or enlarged by reason of the constant concussion to which it is subjected in passing over the rails of the track. When, as is the case with all wheels of the class of that shown in the Letters Patent referred to, the rim and the interior parts of the wheel are not integral, this gradual enlargement of the rim, unless compensated for, becomes a serious defect, as thereby the spokes become loose and the wheel is rendered unsafe.

It is the object of the present invention to provide a means whereby this gradual enlargement of the rim of the wheel is compensated for and the spokes are always held tightly in both the hub and rim.

To that end the invention consists in certain details in the construction of the spoke, singly and in combination with the other parts of the wheel, all of which will now be fully described and particularly pointed out.

In said drawings, Figure 1 is a transverse vertical section of a wheel of the construction shown in the Letters Patent referred to, and provided with spokes embodying the present invention. Fig. 2 is a plan of the spoke before twisting, and Fig. 3 is a perspective view of the finished spoke.

The spoke, and also the wheel shown in the present case, are, in their general construction, the same as those shown in the Letters Patent referred to. A very brief description, therefore, of those features common to both will suffice.

The rim 1 of the wheel, which is of cast or wrought iron or steel, is of the usual shape, and is provided around its inner periphery with the series of mortises 2, to receive the tenons 3 of the spokes.

The spokes 4 are made from common commercial bar-iron cut to the proper lengths, beveled at their inner ends, and twisted by a quarter-turn, to provide the shoulders 5 on both sides for the hub-plates 6, which are seated against these shoulders and secured in position by the bolts 7, passing through holes 8, all as fully described in the Letters Patent referred to.

It will be readily seen that in the construction shown, as the rim 1 becomes enlarged by reason of the drawing process hereinbefore referred to, it will, unless compensated for, move away from the shoulders 9 of the spokes, so as to make the whole structure loose and unsafe. To compensate for this enlargement of the rim and to make it certain that the spokes shall always be firmly seated against it, the spokes are provided with holes 10, located as shown in Figs. 2 and 3, so as to cut the columns of metal forming the longitudinal axes of the spokes. From this it results that when the mandrel is forced between the converging ends of the spokes to seat them against the rim, as fully set forth in the Letters Patent referred to, it acts, not against the resistance of the straight columns of metal, but against the resistance of the curved portions or wings 11, which, as will be readily understood, will spring, so that the spokes will be slightly shortened by the pressure applied. The force thus expended in springing and shortening the spokes will of course be constantly exerted in tending to restore them to their normal length and shape, so that as the rim of the wheel is gradually enlarged the spokes will constantly press outward and remain firmly seated against its inner periphery.

What I claim is—

1. A spoke, as 4, made of bar metal twisted by a quarter-turn, and provided with a hole, as 10, located so as to cut the longitudinal axis of the spoke at the point of the twisting, substantially as described.

2. The combination, with the rim and the hub-plates, of the series of spokes, made of bar metal twisted by a quarter-turn, and provided with holes, as 10, located so as to cut the longitudinal axes of the spokes at the point of the twisting, substantially as described.

In testimony whereof I have hereunto set my hand in the presence of two subscribing witnesses.

GEORGE W. MILTIMORE.

Witnesses:
 THOS. E. PATTERSON,
 DANL. McBAIN.